March 15, 1949.  M. M. SEELOFF ET AL  2,464,752
CHAIN WELDER
Filed Feb. 26, 1947  8 Sheets-Sheet 1

Inventors
MELVIN M. SEELOFF
LEROY CONKLIN

By Francis J. Klempay
Attorney

March 15, 1949.    M. M. SEELOFF ET AL    2,464,752
CHAIN WELDER
Filed Feb. 26, 1947    8 Sheets-Sheet 4
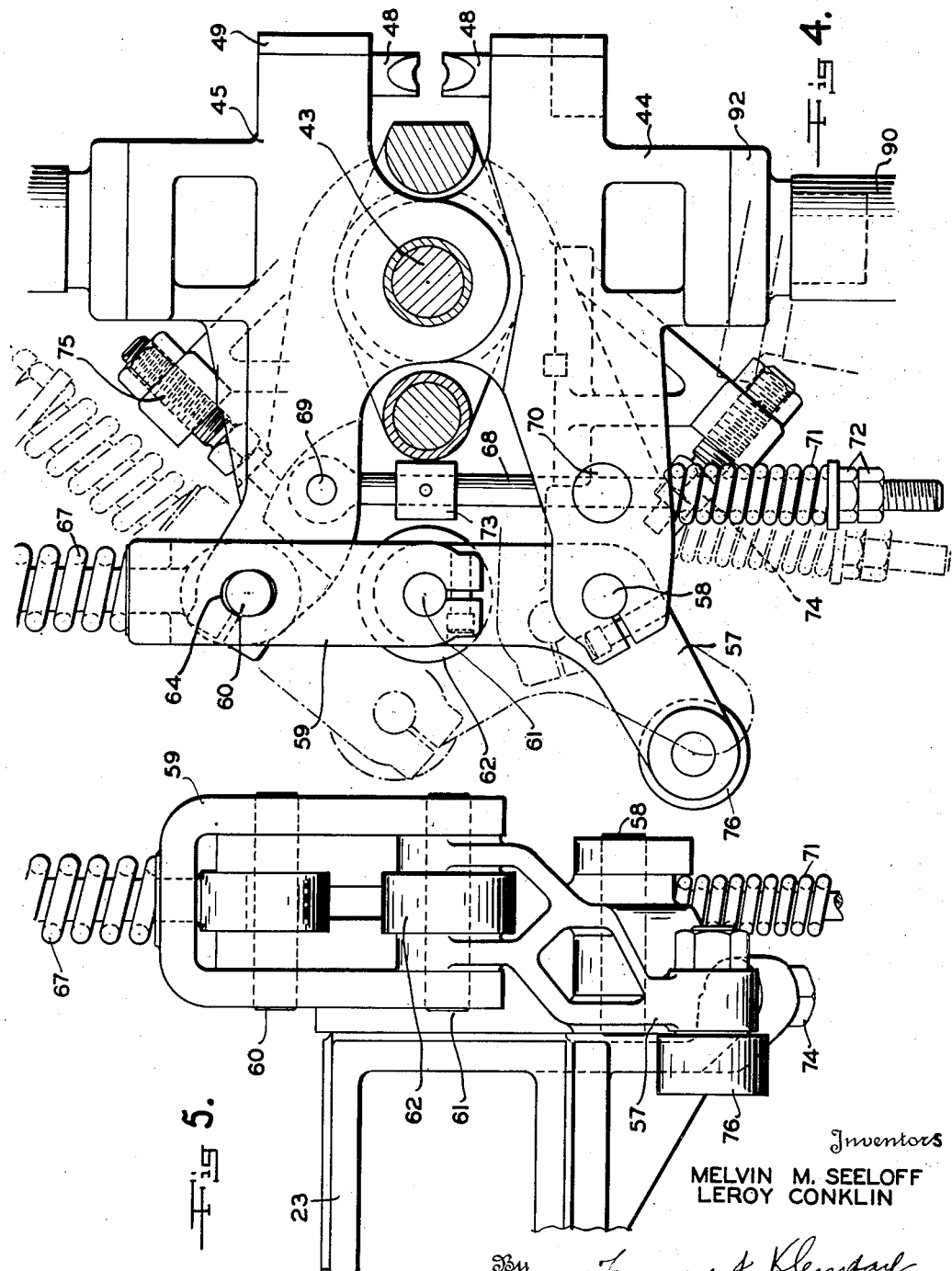
Inventors
MELVIN M. SEELOFF
LEROY CONKLIN

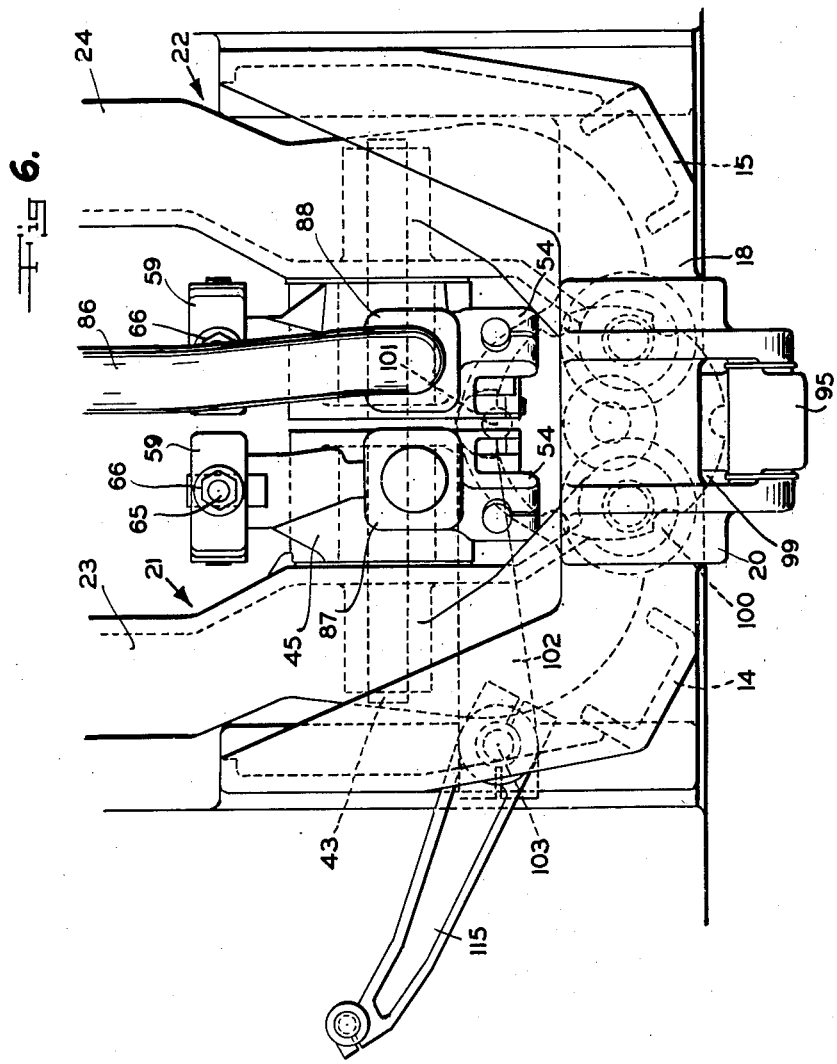

March 15, 1949.　　　M. M. SEELOFF ET AL　　　2,464,752
CHAIN WELDER
Filed Feb. 26, 1947　　　　　　　　　　　　8 Sheets-Sheet 6
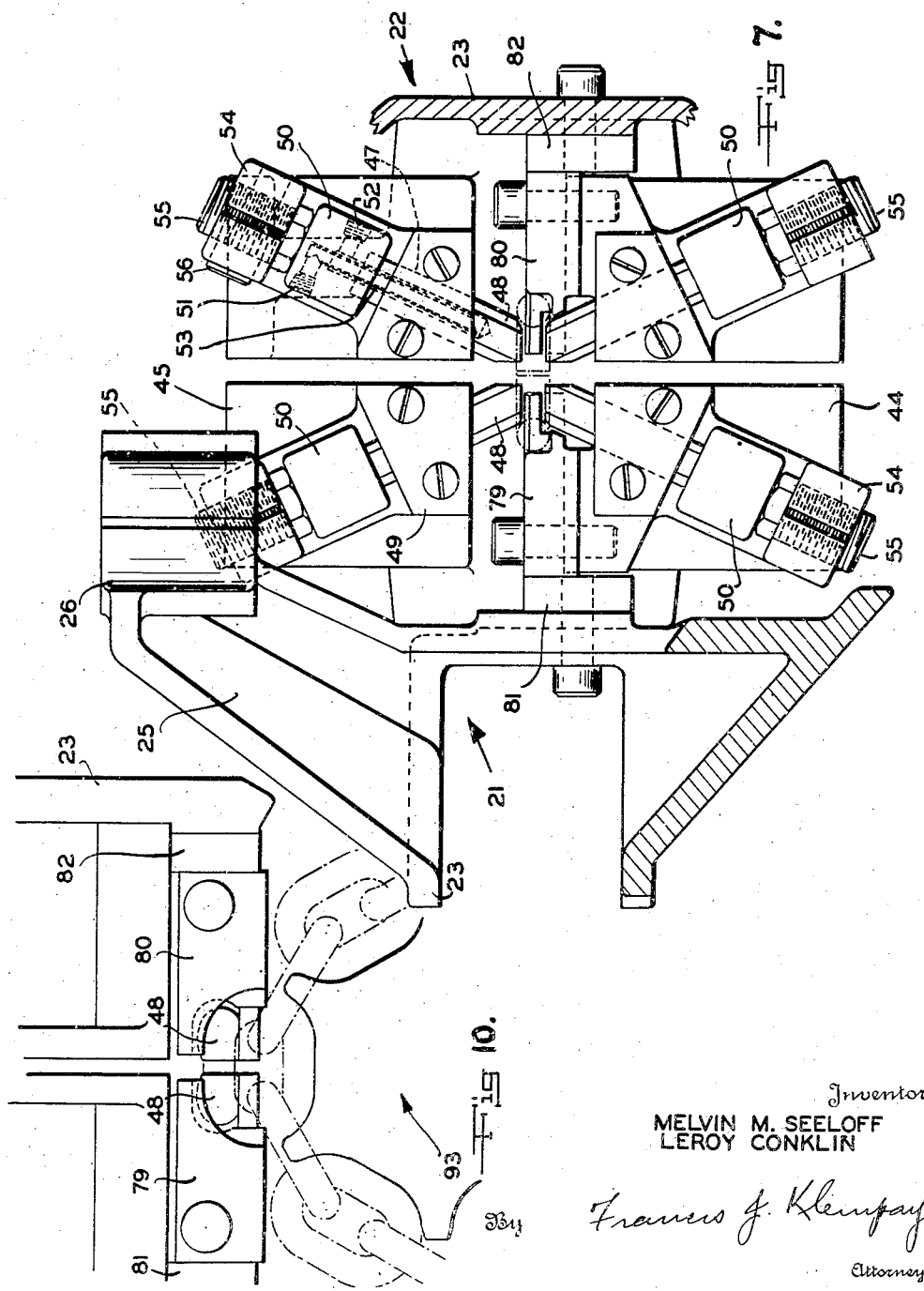
Inventors
MELVIN M. SEELOFF
LEROY CONKLIN
By Francis J. Klempay
Attorney March 15, 1949.  M. M. SEELOFF ET AL  2,464,752
CHAIN WELDER
Filed Feb. 26, 1947  8 Sheets-Sheet 7
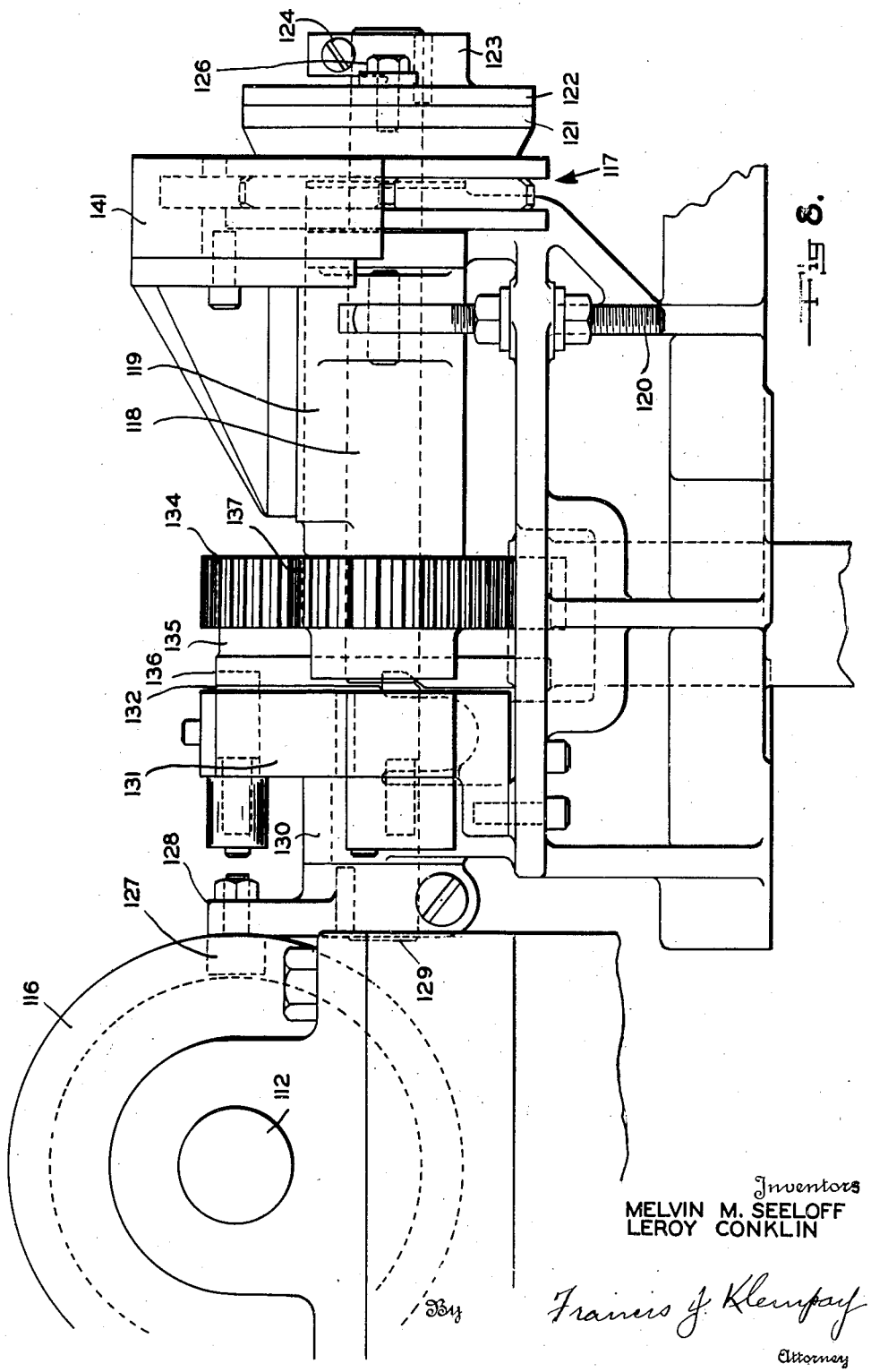
Inventors
MELVIN M. SEELOFF
LEROY CONKLIN
By Francis J. Klempay
Attorney

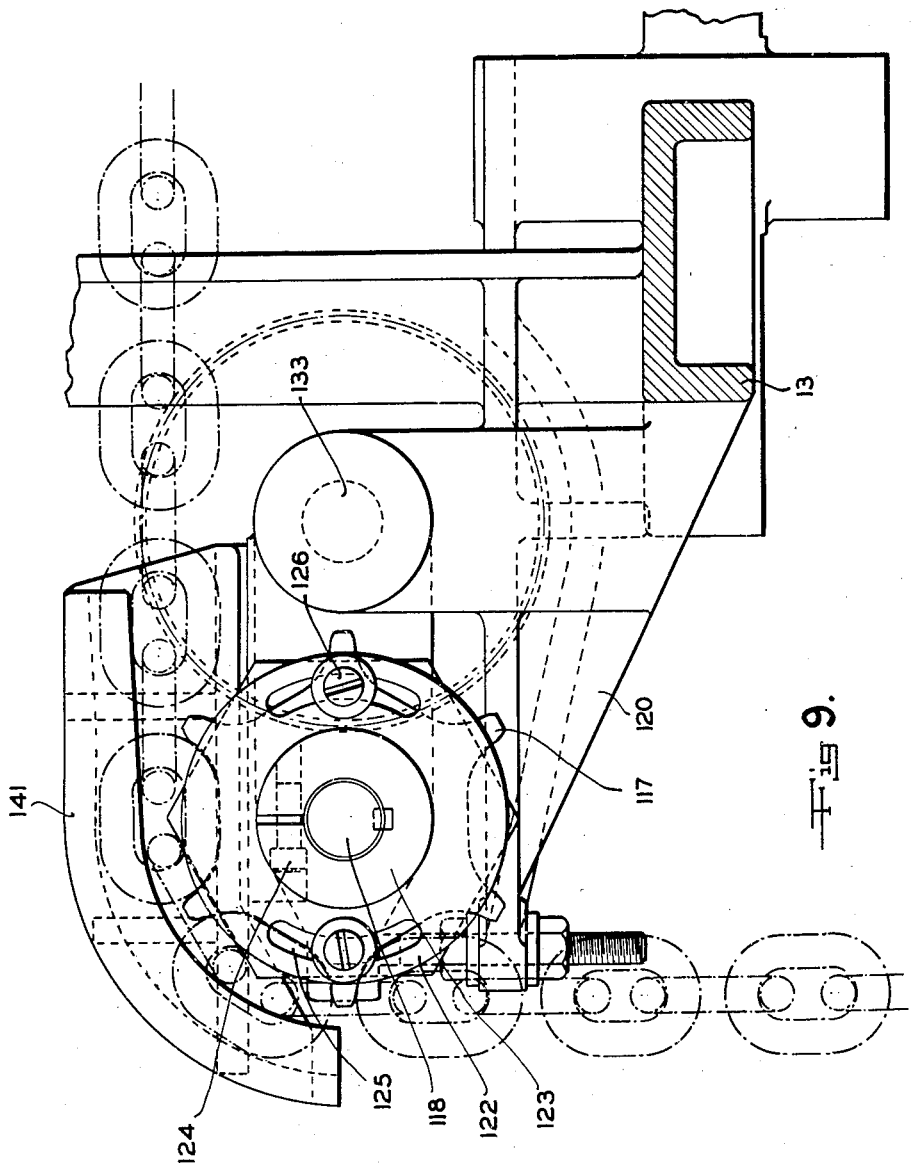

Patented Mar. 15, 1949

2,464,752

UNITED STATES PATENT OFFICE 2,464,752

CHAIN WELDER

Melvin M. Seeloff and Leroy Conklin, Warren, Ohio, assignors to The Taylor-Winfield Corporation, Warren, Ohio, a corporation of Ohio Application February 26, 1947, Serial No. 730,900

25 Claims. (Cl. 219—5)

1

This invention relates to a production machine for automatically welding the open clefts in preformed links of an assembled chain which links are constructed of rod or wire. It has heretofore been proposed to provide automatic electric resistance welding machines which are operative to receive an assembled chain of open links and to automatically apply to the alternate (or successive) links in the chain proper heating currents and forging pressures to securely close the links thereby producing the completed chain. This invention is directed to the specific improvements in such automatic welding apparatus and has as its principal object the provision of such apparatus which is more rugged and durable and which is capable of a higher sustained rate of production than machines heretofore proposed for comparable purposes. It is also a primary object of the invention to provide an automatic chain welding machine which is capable of a high rate of production over prolonged periods but which requires minimum maintenance, which is readily adjusted for efficient operation, and in which the changing over of the machine to a manufactured chain of a different size or character may be more quickly accomplished.

A more specific object of the invention is the provision in a machine of the character described above of improved arrangements for mounting and operating the welding pressure applying dies and of mounting and supplying coolant to the welding current-carrying electrodes.

Another object of the invention is the incorporation of the operative welding elements of the machine in a unitary compact assembly housed within an efficiently rigid box-like frame for maximum physical protection of the elements and to provide a durable arrangement for carrying the thrusts required in forging the respective links of the chain being manufactured.

A further object of the invention is the provision in an automatic welding machine of the character described above of a substantially simplified and materially improved arrangement for mounting and operating the electrode-carrying elements and for effecting compliance of movement of these elements with the upset or forging dies whereby welds of consistent quality may be effected in the respective links of the chain being manufactured and whereby the operative elements of the machine are subjected to the least possible wear and depreciation.

Other specific objects of the invention are the provision of an improved arrangement for centering or aligning the respective links of the chain with respect to the welding station of the apparatus, of an improved arrangement for feeding the chain through the machine, and of an improved arrangement for movably carrying the chain link locator whereby the same may be readily swung out of the way to facilitate change and adjustment of the upset dies and of the current-carrying electrodes.

The above and other objects and advantages of the invention will become apparent upon consideration of the following detailed specification and the accompanying drawing wherein there is disclosed a preferred embodiment of the invention.

In the drawing:

Figures 4 and 5 are side and end elevations, respectively, of one of the two pairs of upset die and electrode-carrying pliers utilized in the machine of Figure 1;

Figure 6 is a fragmentary plan view, on an enlarged scale, of the welding station of the machine of Figure 1;

Figure 7 is a fragmentary front elevation, on an enlarged scale, of the upset die and electrode mounting elements of the assembly of Figure 1;

Figures 8 and 9 are partial elevations, on an enlarged scale, of the machine of Figure 1, the views being taken from the lines VIII—VIII and IX—IX, respectively, of Figure 1; and Figure 10 is a fragmentary plan view of an assembled link and upset dies of the machine of Figure 1.

Figure 1:
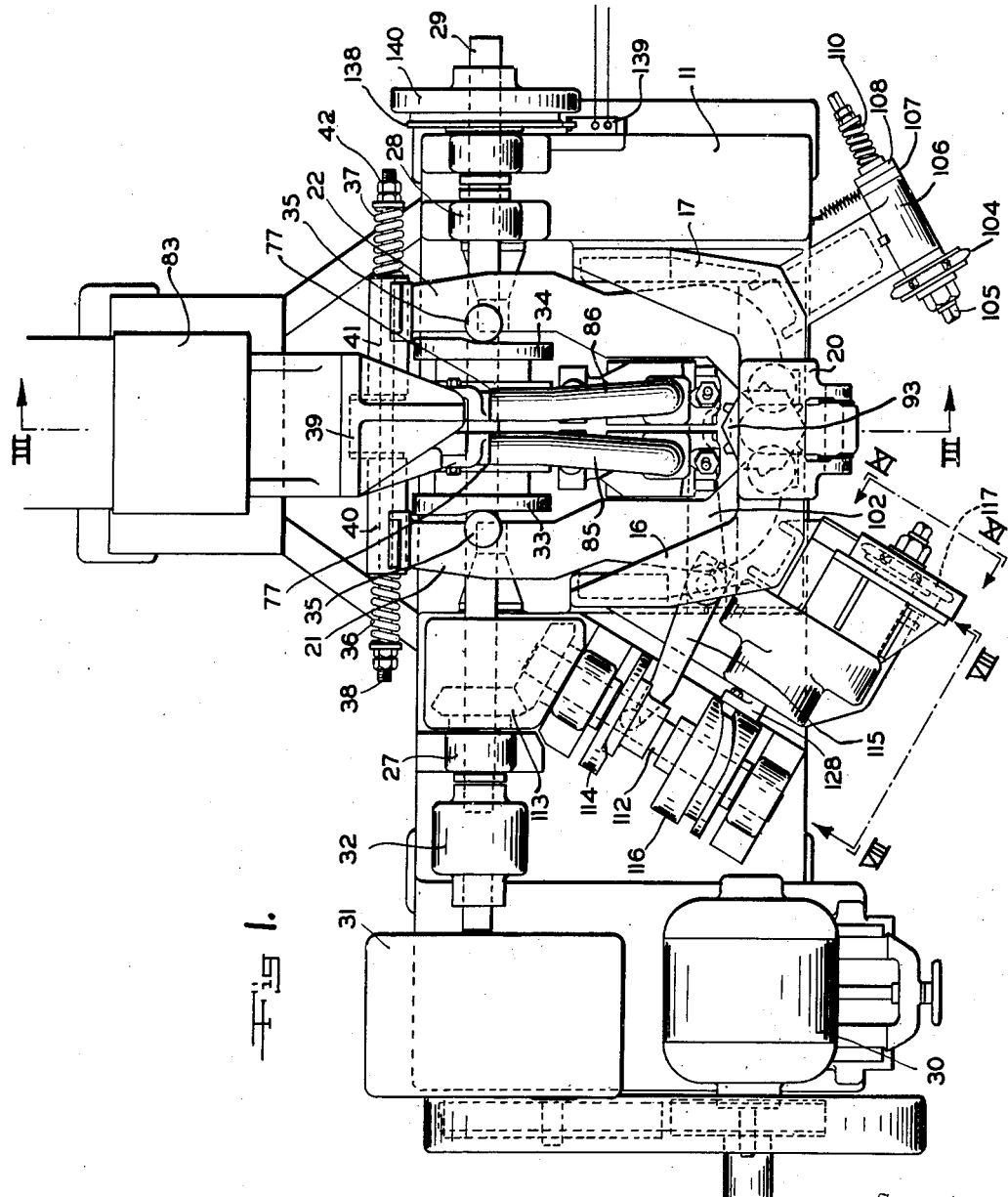
Figure 1 is a plan view of an automatic chain welding machine constructed in accordance with the principles of the invention.

Referring to the drawing in detail, reference numeral 11 designates a base of suitable fabrication on which all of the operative elements of the machine are assembled. Rigidly mounted on the forward portion of the base 11 is a windowed frame, designated generally by reference numeral 12, and comprising a lower strut 13, integral spaced upwardly extending members 14 and 15, integral rearwardly and downwardly extending braces 16 and 17 which connect with the members 14 and 15 respectively, and an integral upper strut 18 which interconnects the upper ends of the members 14 and 15 respectively. This frame assembly is securely attached to the base 11 and it should be apparent that the elements 13—15 and 18 provide an extremely rigid ring-like frame which is simple in design and construction but which nevertheless is most effective in resisting expansive forces as will appear more fully hereinafter.

Figure 2:
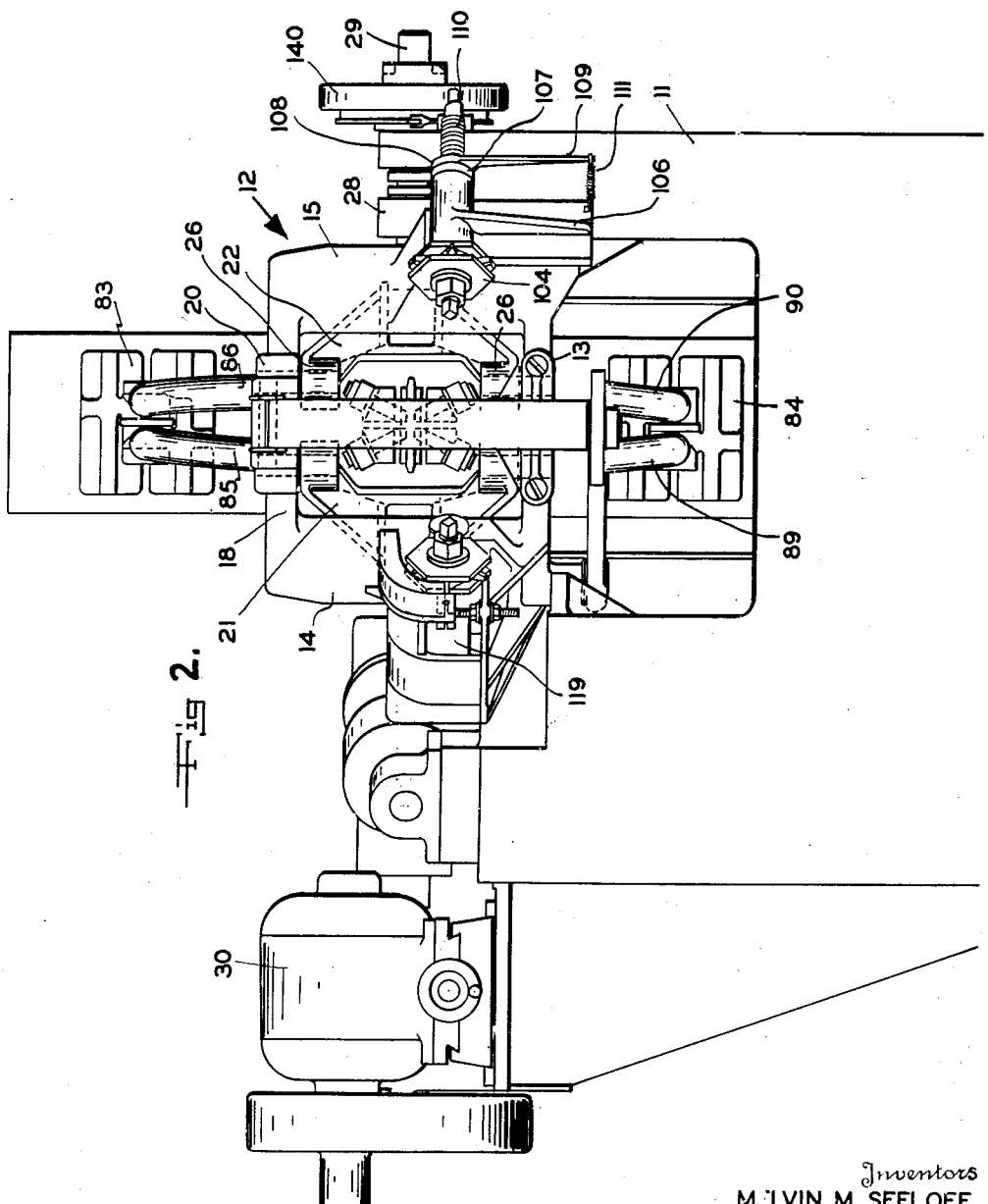
Figure 2 is a front elevation of the machine of Figure 1.

Pivotally mounted in the frame 13—18 is a pair of opposed arms which carry both the welding electrodes and the upset dies, and these arms designated generally on the drawing by reference numerals 21 and 22 will hereinafter be referred to as upset arms. Arms 21 and 22 are generally channel shaped in their intermediate portions as shown at 23 and 24, respectively, so that they possess substantial resistance to bending or deflection about vertical axes. The forward ends of arms 21 and 22 are bifurcated at 25 as shown more clearly in Figures 3 and 7 and at the outer end of each bifurcation there is an integral bored boss 26 which receives the pivot pins by which the arms are pivotally mounted. Two of these pivot pins are received in apertures in the lower strut 13 and project upwardly therefrom into the two lower bosses 26 while the other two of these pins are received in apertures formed in the upper strut 18 and project downwardly therefrom into the upper bosses 26. Any suitable expedient may be employed to retain these four short pivot pins against axial movement. By referring to Figures 1 and 2 it will be observed that the arms 21 and 22 are curved inwardly at their forward bifurcated ends whereby the pivot pins therefor are grouped closely adjacent each other and this feature is highly advantageous as will appear more fully hereinafter. It should also be observed that the windowed nature of the frame 13—18 and the open construction provided by the bifurcations 25 enables ready access to be had to the space between the arms 21 and 22 from the forward end of the machine. The means to rock the arms 21 and 22 about the vertically aligned pivot pins above mentioned will now be described.

Journaled in suitable bearing blocks 27 and 28 mounted on the rear portion of the top of base 11 is a drive shaft 29 which is arranged to be driven from a motor 30 through a gear reduction 31 and a safety clutch 32. Keyed on the shaft 29 is a pair of spaced cam wheels 33 and 34 each bearing a cam surface on its outer face. The upset arms 21 and 22 are suitably apertured to receive the shaft 29 and rotatably mounted on the upper edge of each of the arms 21 and 22 is a cam follower 35 which is arranged to co-act with the cam faces on the wheels 33 and 34, respectively. Wheels 33 and 34 are aligned circumferentially so that upon rotation of the shaft 29 the arms 21 and 22 will be simultaneously moved apart. These arms are moved toward each other by a pair of spaced coil springs 36 and 37 which are mounted on opposite ends of a rod 38 which is received in and projects outwardly from sleeves 40 and 41 rigidly secured to the rear ends of arms 21 and 22, respectively. The outer end portions of the rod 38 are threaded to receive adjusting and lock nuts 42 whereby the degree of compression of the springs 36 and 37 may be controlled. As will appear later, the force exerted by the springs 36 and 37 determines the final forging or welding force applied to the links being welded and it should therefore be apparent that the adjustable nuts 42 provide a simple and effective means for varying this welding force.

There is mounted on each of the upset arms 21 and 22 an assembly consisting of two relatively movable arms each carrying a welding electrode and one carrying, in addition, an upset die; and since these two assemblies are identical in construction and operation only one will be described in detail. Thus, rigidly anchored in the arm 21 and projecting inwardly therefrom is a pivot pin 43 (see Figures 3 and 6) on which is pivotally mounted a lower clamping arm 44 and an upper clamping arm 45. The forward ends of the arms 44 and 45 are each formed with a projection 46 in which is machined an obliquely disposed slot 47 to slideably receive a welding electrode 48. A removable cover plate 49 is applied over each projection and slot to complete the guide for the electrode thereby preventing movement of the electrode in any lateral direction. Each electrode is countersunk in a block 50 which is positioned outwardly of the plates 49 and which is provided with laterally extending ports 51 and 52 for the ingress and egress, respectively, of water or other coolant furnished the electrode. As shown more clearly in Figure 7 the electrode 48 has a bore extending inwardly from its outer end and projecting in this bore is a small tube 53 which is anchored in the block 50 and which is in communication with the port 51. The outer diameter of the tube 52 is somewhat smaller than the diameter of the bore in electrode 48 and the diameter of the bore in block 50 which communicates with outlet port 52 so that water or other coolant may be directed through the port 51 down to the tip of electrode 48 and thence outwardly through the port 52. To provide effective means for backing up the electrodes and to provide for their minute positional adjustment a split boss 54 is formed on the outer end of each of the arms 44, 45 in alignment with the electrode guiding slots. The bosses 54 have threaded bores in which are received headed screws 55 with the heads thereof bearing against the outer surface of the blocks 50. Suitable locking means, as the screws 56 for example, may be employed to lock the screws 55 in adjusted position. It should be understood that in practice a locking screw 56 will be provided for each of the adjusting screws 55 and that upon release of the screws 56 the screws 55 may be rotated to advance the electrodes 48 inwardly a precisely determined distance to effect optimum electrode pressure and to compensate for wear of the electrodes as will be understood.

The arms 44 and 45, being pivoted on the common pin 43, act as a pair of pliers in gripping the chain link by the electrodes upon closing movement of the outer ends of the arms and to effect such closing movement we provide a toggle arrangement consisting of one leg of a bellcrank lever 57 which is pivotally connected with the rear end of the arm 44 by means of a pivot pin 58 and of a second lever 59 which is pivotally connected with the rear end of the arm 45 by means of a pivot pin 60. The two toggle links thus provided are interconnected by a pivot pin 61 and it will be obvious upon inspection of Figures 3 and 4 that upon movement of the pin 61 toward the pivot pin 43 the electrodes 48 carried by the forward ends of the arms 44 and 45 will be brought toward each other. To effect such closing movement of the toggle 57, 59 we provide a cam follower 62 which is rotatably mounted on the pivot pin 61 and which is arranged to be actuated (i. e. moved from broken to full line position in Figure 4) by a cam 63 which is keyed on the drive shaft 29 (see Figure 3). During such movement the center of pin 61 travels through the plane which includes the axes of pivot pins 58 and 60 so that once having been fully actuated by the cam 63 the toggle will be locked in extended position as will be understood.

To control the clamping pressure exerted by the electrodes 48 on the work the aperture in the link 59 which receives the pin 60 is elongated longitudinally of the link as shown at 64 and projecting longitudinally outward of the link 59 is an eye bolt 65 the eye of which encircles the pin 60. Interposed between adjustable nuts 66 on the outer end portion of bolt 65 and the projecting outer end of the link 59 is a coil spring 67 the expansive force of which determines the pressure exerted by the electrodes 48 on the work piece when the pin 60 is floating intermediate the limits of the elongated aperture 64 as will be understood. In setting up the machine the screws 55 are, of course, so adjusted that upon the electrodes engaging the work piece and the toggle being fully actuated the pin 60 will be positioned intermediate its limits of travel in the elongated aperture 64. Now by running the nuts 66 down or up the electrode clamping pressure may be increased or decreased as desired. To open the forward ends of the arms 44 and 45 upon "breaking" of the toggle 57, 59 we provide an eye bolt 68 which is pivotally connected with the rear end portion of the upper arm 45 at pin 69 and which is slideably received in a transverse bore formed in a pin 70 which is loosely received in an aperture formed in the rear portion of the lower arm 44. A coil spring 71 is positioned about the outer end of the bolt 68 and is held in compression by the adjusting and lock nuts 72. The action of the spring 71 therefore is to draw the rear ends of the arms 44 and 45 toward each other thereby opening the forward ends of these arms and the electrodes. A collar 73 is secured on the bolt 68 to limit inward movement of the cam follower 62 thereby limiting movement of the toggle past dead center upon the toggle being actuated.

The range of rotative movement of the arms 44 and 45 about the axis of pin 43 is restricted by an adjustable stop 74 which limits downward movement of the rear portion of arm 44 and by the adjustable stop 75 which limits the upward movement of the rear portion of the upper arm 45.

Figure 3:
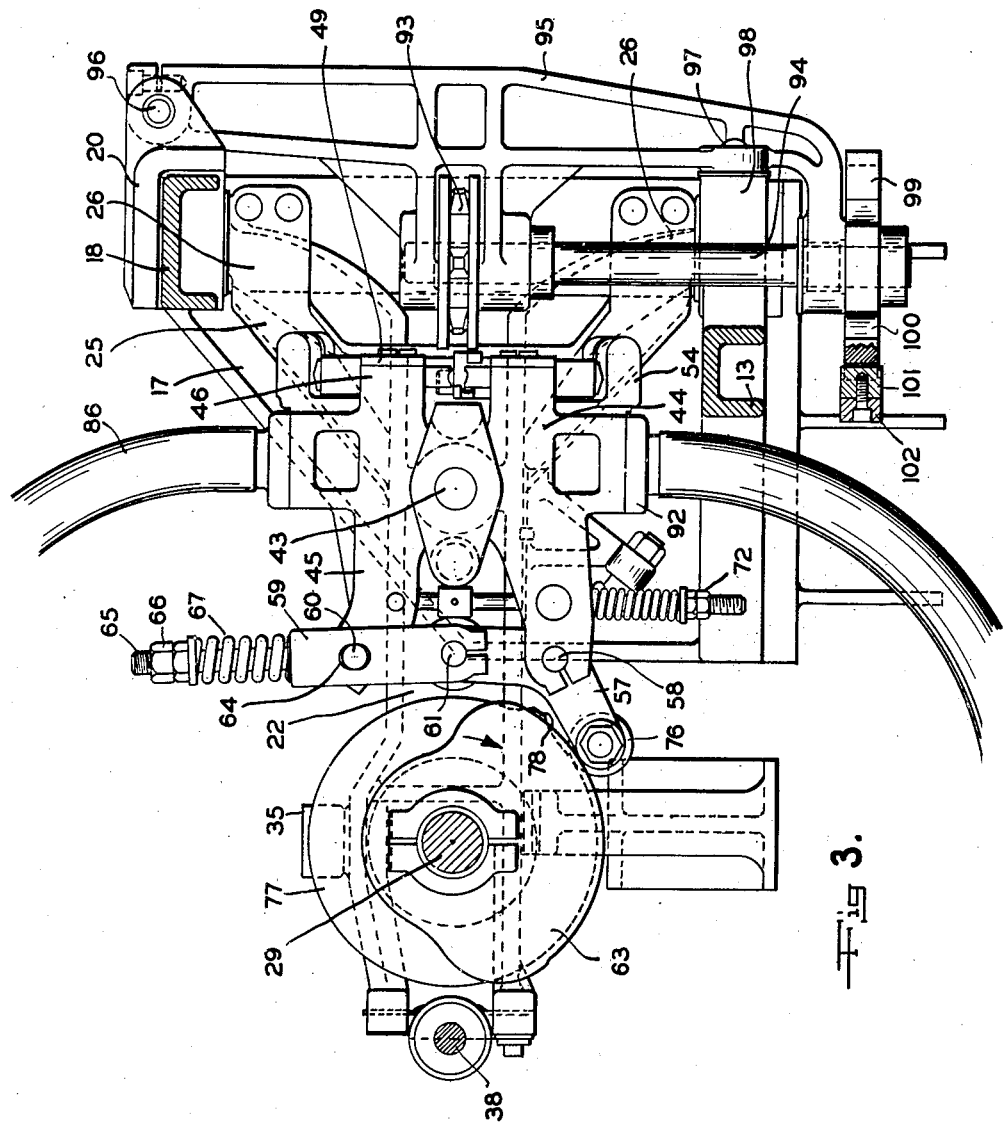
Figure 3 is a fragmentary transverse sectional view taken substantially along the line III—III of Figure 1.

Once the toggle 57, 59 is actuated to position shown in Figures 3 and 4 the electrodes 48 will remain in pressure engagement with the work with the force determined by the setting of spring 67 due to the over-center nature of the toggle as explained above. Thus, during the actual welding cycle the cam follower 62 may be free of any cam surface and, in fact, during this interval the peripheral surface of cam 63 opposite the follower 62 recedes substantially from the follower. This enables the electrodes to be quickly opened at the end of the welding cycle and to accomplish this desirable quick opening we rotatably mount a cam follower 76 on the outer end of the lower leg of the bellcrank toggle lever 57. Roller 76 is arranged to be actuated (i. e. moved downwardly to "break" the toggle) by a cam 77 which is adjustably keyed onto the shaft 29 and which bears a peripheral high point 78. As the cam portion 78 comes in contact with the roller 76 the toggle is abruptly broken to rapidly move the electrodes 48 away from the work.

The machine herein described employs two upset dies for engaging the opposite rounded ends of the chain links to be welded and in Figures 7 and 10 these dies are shown and indicated generally by reference numerals 79 and 80. These dies each comprise a hardened steel block formed at one end with a recess to provide a small lip engaging underneath the link ends and to provide a concave surface for snugly fitting the outer rounded end of the link. As shown more clearly in Figure 7 one of the dies, as 79, is rigidly but detachably secured to the upper forward edge of the arm 44 which is pivoted on the upset arm 21 while the die 80 is similarly mounted on the corresponding lower arm which is pivoted on the opposite upset arm 22. The outer ends of dies 79 and 80 are ground flat and are backed up by flat wear blocks 81 and 82 which are secured to the inner faces of the upset arms 21 and 22. It should be observed that this construction enables the upsetting force to be transmitted from the arms 21 and 22 to the chain link being welded directly through solid metal which comprises the blocks 81 and 82 and the dies 79 and 80. Loosening of the parts under long and severe conditions of service is thereby minimized. Also, since the inner faces of the blocks 81 and 82 are flat and parallel the dies 79 and 80 can have vertical movement relative to the blocks 81 and 82 as is required because the dies are positioned forwardly of the pivot pins 43 and in any relative position of the parts the dies are effectively backed up by the blocks 81 and 82.

In the machine illustrated welding current is furnished the electrodes by two welding transformers 83 and 84, the former of which is provided with two secondary terminal leads 85 and 86 which are connected through the lugs 87 and 88 with the split bosses 54 carried by the two upper arms 45 of the assembly. The lower transformer is connected with the two lower electrodes 48 through secondary leads 89 and 90 through lugs 91 and 92 and the split bosses 54 which are carried by the two lower arms 44 of the assembly. The connectors 87, 88, 91 and 92 may be either suitably electrically connected with the bosses 54 or may be made integral therewith, as desired, and of course suitable insulation, not shown, is employed wherever required. By making these parts as well as the screws 55 and blocks 50 of highly conductive copper alloy transmission of the electric welding current to the electrodes 48 may be made highly efficient.

The means for feeding a chain of pre-formed but open links into the machine and for accurately positioning the respective links at the welding station will now be described. First, we provide, more or less in accord with usual practice, a turret or locating sprocket 93 (Figures 1 and 3) which has a flange on opposite sides of the sprocket teeth so that alternate links of the chain may be held securely therein. As will appear more fully below, the chain to be welded is entrained onto the locator sprocket 93 along a horizontal path and so oriented that alternate links lie in a horizontal plane while the intervening links are disposed vertically, and it will be understood that the horizontally disposed links will have their closed longitudinal reaches held between the flanges of sprocket 93 while their opposite or open reaches are presented to the welding electrodes and dies. Sprocket 93 is keyed onto a vertically disposed shaft 94 which is journaled in a carrier 95 which depends down over the front of the frame 13—18. The upper end of carrier 95 is pivoted at 96 to a block 20 which is rigidly connected to and carried by the center portion of the upper strut 18 of the windowed frame 13—18. The lower portion of the carrier 95 is detachably secured to the lower strut 13 of the frame 13—18 by the screws 97, for example, and it should be observed that the strut 13 is curved inwardly at 98 into U-shape to provide clearance for the vertically disposed shaft 94.

Keyed to the lower end of shaft 94 is a disc 99 having a plurality of circumferentially spaced locating detents 100 formed in its outer periphery (Figures 3 and 6). Arranged to sequentially engage the detents 100 is a rounded pawl 101 which is carried by an arm 102 which in turn is pivoted on the frame of the machine at 103. The operation of this mechanism is such that if the disc 99 is rotated during retraction of the pawl 101 to approximately position one of the detents 100 opposite the pawl the subsequent inward movement of the pawl will, because of its rounded nature, rotate the disc 99 slightly in one direction or the other whereby the pawl will be seated in the aligned detent to thereby effect a precise orientation of the disc 99 and consequently of the locator sprocket 93. Since the arm 102 and pawl 101 is positioned in back of the disc 99 the disc 99 as well as the shaft 94 and sprocket 93 may be readily swung outwardly up and away from the machine proper about the pivot 96 upon release of the screws 97. This arrangement provides a most convenient means for opening up the space in front of and about the welding electrodes and dies to facilitate their inspection, adjustment and maintenance.

A guiding and back-tensioning sprocket 104 receives the chain to be welded before it is entrained onto the locator sprocket 93 and, as shown, this sprocket is constructed similarly to the sprocket 93. Sprocket 104 is keyed to a shaft 105 which is journaled in a housing 106 mounted on the frame member 15. Also keyed on the shaft 105 is a clutch disc 107 which is engaged by a second clutch disc 108 carrying a radially extending arm 109. A coil spring 110 encircling the end of shaft 105 applies resilient pressure between the discs 107 and 108 tending to rock the arm 109 outwardly upon rotation of the sprocket 104 in a chain-feeding direction. Outward movement of the lower end of the arm 109 is yieldingly resisted by a spring 111 and thus the arrangement of the assembly is such that the sprocket 104 always tends to effect back tension in the chain and, further, will move the chain backward slightly if allowed to do so by rotation of the locator sprocket 93 by action of the pawl 101 as will be understood. The chain is thus always kept under some tension which insures its accurate positioning on the sprocket 93 and with respect to the welding dies and electrodes of the machine.

Referring now more particularly to Figures 1, 2, 8 and 9, the means to periodically draw the chain through the machine successive distances represented by the intervals between alternate chain links and in timed sequence with respect to the operation of the welding cycle comprises a shaft 112 which is driven from the principal drive shaft 29 through bevel gears 113. Also rigidly keyed on the shaft 112 is a cam 114 which through the medium of a lever 115 (Figures 1 and 6) periodically retracts the pawl 101 during the general indexing movement of the locator 93. Lever 115 is rigidly connected to the arm 102 and both pivot about the pin 103 as a unit. Shaft 112 drives the pull-out sprocket through cam 116 and connecting linkage now to be described more in detail. As shown in Figures 1, 2, 8 and 9 the pull-out sprocket 117 is mounted on a shaft 118 which is journaled in a housing 119 suitably bracketed on the frame member 14 as at 120. Sprocket 117 is constructed similarly to sprockets 93 and 104 but has an additional integrally connected hub 121 through which it is driven, it being understood that the sprocket 117 is not directly keyed onto the shaft 118. To drive the sprocket 117 from the shaft 118 we provide a driving disc 122 having an integral split collar 123 which is keyed to the shaft 118 as shown.

The split mounting collar 123 has a clamping screw 124 whereby the disc 122 and collar 123 may readily be detached from the end of the shaft 118. Disc 122 has a pair of arcuate slots 125 through which extend cap screws 126 having threaded engagement with bores formed in the hub 121 of the sprocket 117. Thus, the fixed angular relation of the sprocket 117 with respect to the shaft 118 may readily be minutely adjusted simply by loosening the cap screws 126 and as will become apparent hereinafter this provides a simple and convenient means for insuring sufficiently approximate indexing movement of the locator 93 and the readily detachable nature of the driving disc and sprocket 117 facilitates the re-setting of the machine to handle chains of different size or character.

Shaft 118 is arranged to be periodically driven from the continuously rotating cam 116 by a ratchet mechanism and step-up gears now to be described. Cam 116 has a peripheral groove of axially varying position and seated in this groove is a follower 127 carried by the outer end of an arm 128. Arm 128 is, in turn, keyed onto a shaft 129 which is journaled in a boss 130 and on the opposite side of this boss there is rigidly keyed to the shaft 29 a carrier 131 mounting one or more spring-pressed ratchet pawls 132 which project outwardly from the face of carrier 131 opposite the boss 130. Shaft 129 is axially aligned with a countershaft 133 which is suitably journaled in the frame and which rotatably mounts a spur gear 134 having an integrally connected hub 135 mounting on its face a series of ratchet teeth 136. Teeth 136 are engaged by the ratchet pawls 132 so that during each revolution of the cam 116 and the consequent rocking movement of the shaft 129 the gear 134 will be advanced a predetermined extent in a forward direction. Meshing with the gear 134 is a pinion gear 137 which is keyed onto the shaft 118 so that upon incremental movement of the gear 134 the pull-out sprocket 117 will be rotated through an angular distance determined by the ratio between gears 137 and 134 and by the throw of cam 116. Normally the cam 116 is not removed from the assembly but the gears 134 and 137 may be readily changed to vary the angular throw of the sprocket 117 and this adjustment provides for operating on chains of different size. It should be understood that the throw of cam 116 and the ratio of the gears 134 and 137 as well as the pitch diameter of the sprocket 117 is such that during each complete revolution of the cam 116 representing one complete cycle of operation of the machine the angular throw of sprocket 117 is just sufficient to move the next succeeding horizontally disposed link on the locator 93 to proper position in the opened welding dies and electrodes. During the cycle of operation and immediately following the completion of throw of the cam follower 127 in a direction tending to draw the chain through the machine the lever 115 is actuated by cam 114 to center the locator 93 by means of the pawl 101 in the manner explained above.

It should now be apparent that we have provided an improved automatic chain welding machine which accomplishes the objects initially set out. The machine of the invention is simple but rugged and compact in design and possesses an inherent strength and operating efficiency which makes it especially capable of high speed operation over long periods of service. The sequencing of actuation of the respective operative parts of the assembly is accomplished through simply constructed but rugged and durable mechanical means which need not be disturbed during normal servicing and readjustment of the machine. The single shaft 29 carries the timing and actuating cams 63 for closing the dies and electrodes against the link to be welded on opposite sides of the cleft and also a cam 138 for actuating a switch 139 to initiate the flow of energizing current to the transformers 83 and 84. Now it is obvious that the cam 63 and the cam 138 may be readily so relatively oriented that welding current is caused to flow immediately upon the clamping of the work piece or link being completed. Any suitable circuit, not shown, for controlling the duration of the welding current flow and its RMS current value may be employed to control the flow of energizing current through the transformers 83 and 84 in response to actuation of switch 139. A hand wheel 140 is keyed onto shaft 29 to facilitate adjustment of the machine.

With the secondary circuits of the transformers connected in the manner above explained, the welding current is caused to flow across the open cleft of the link along paths substantially normal to the plane of the cleft and on opposite sides of the link, all as more fully described in U. S. Patent No. 1,310,555 of July 22, 1919. We have found, however, that although the two transformers and the two sets or pairs of welding electrodes provide two parallel current streams and therefore some distribution of the heating effect across the face of the cleft, that the metal of the link which is closer to the outer peripheral surface of the rod stock across the cleft has a tendency to heat considerably faster than the core of the rod stock thereby making quality welds difficult to attain and causing uneven upset. To overcome this difficulty we have, in certain instances, connected the secondary terminals of the welding transformers across the cleft to be welded in a crisscross manner as taught in U. S. Patent No. 1,243,004 of October 16, 1917 and have obtained better results thereby. With this connection maximum current density occurs at the core of the stock, making a sounder weld nugget and minimizing upset deformation of the rod stock.

Continuing the above description of the cycle of operation of the machine disclosed, the high point of the cams 33 and 34 will ride off the followers 35 a predetermined time interval following the initiation of flow of welding current to allow the coil springs 36 and 37 to urge the rear ends of the arms 21 and 22 inwardly to thereby force the dies 79 and 80 inwardly to close up the link under pressure. Since at this time the surfaces of the open cleft of the link are heated to a proper welding temperature the link will be securely closed by welding.

Next in the cycle of operation the high points of the cam 77 ride against the followers 76 on the bellcrank levers 57 to "break" the toggles 57, 59 thereby releasing the chain link just welded from the electrodes 48 and the dies 79 and 80. The arms 21 and 22 carrying these electrodes and die clamping sets may now be moved apart and this is accomplished by the high portions of the cams 33 and 34 reaching and moving outwardly the followers 35. Immediately this is accomplished cam 116 begins to rock arm 128 to rotate the pull-out sprocket 117 in the manner described above and immediately upon the sprocket 117 reaching the end of its normal angular travel the lever 115 is actuated to center the locator sprocket 93 thus completing the normal cycle of operation and placing the machine in condition to clamp and weld the next succeeding horizontally disposed link which is now accurately positioned at the welding station.

One of the principal advantages of the machine of this invention is the ease with which the machine may be changed over to weld chains of different size or character. This changeover may readily be accomplished simply by changing the sprockets 93, 117, and 104 and as each of these is readily accessible this may be done quickly. To change the sprocket 93 the carrier 95 is, of course, swung upwardly and outwardly and when this carrier is in such out-of-the-way position ready access is had to the dies 79 and 80 to change the same, if required, and to the electrodes 48 to change or adjust the same as required.

To insure proper entrainment of the welded chain over the sprocket 117 to thereby insure that the sprocket 117 will move the chain the required distance during each cycle of operation we provide a guard 141 which fits over and about the sprocket 117.

The above specifically described embodiment of the invention should be considered as illustrative only as obviously many changes may be made therein without departing from the spirit or scope of the invention. Reference should therefore be had to the appended claims in determining the scope of the invention.

What we claim is:

1. Automatic chain welding apparatus comprising in combination an upwardly disposed rigid frame having a centrally located window therein, a pair of upset arms pivotally connected at their forward ends to said frame for movement about upwardly disposed parallel axes, said arms extending rearwardly of said frame, upset dies and welding current conducting electrodes mounted on said arms and operative to engage a link of a chain to be welded at a station disposed substantially centrally but rearwardly of said frame, and a chain link locating sprocket rotatably mounted in said frame for positioning a chain link to be welded at said station.

2. Automatic chain welding apparatus comprising in combination an upwardly disposed rigid frame having a window centrally located therein, a pair of rearwardly extending upset arms pivotally connected at their forward ends to said frame, the forward ends of said arms being bifurcated and flared outwardly in the direction of their pivotal axes to provide ready access through said window to space between said arms, upset dies and welding-current conducting electrodes carried by said arms, adjustable force-applying means engaging the rear ends of said arms and tending to move said rear ends together, power driven means to periodically move the rear end portions of said arms and operative to bring successive chain links to be welded to proper welding position with respect to said dies and electrodes.

3. Automatic chain welding apparatus comprising in combination an upwardly disposed rigid frame having a centrally located window therein, a pair of rearwardly extending upset arms pivotally connected at their forward ends to said frame each at points above and below said window for relative horizontal swinging movement, said arms being bifurcated and flared outwardly in a vertical direction at their forward ends to provide ready access through said window to space between said arms, upset dies and welding-current conducting electrodes carried by said arms, means to move the rear ends of said arms toward and away from each other, and a chain-link locating sprocket rotatably mounted on said frame and positioned centrally with respect to the bifurcations of the forward ends of said arms.

4. Automatic chain welding apparatus comprising in combination a rigid upwardly disposed closed frame having a centrally located window therein, a pair of rearwardly extending upset arms pivotally connected at their forward ends to said frame for relative horizontal swinging movement, the forward ends of said arms being bifurcated and flared both inwardly toward each other and outwardly in the direction of their pivotal axes whereby ready access may be had through said window to space between said arms, upset dies and welding-current conducting electrodes carried on the inner sides of said arms, a chain-link locating sprocket rotatably mounted between the bifurcations of said arms to position chain links to be welded in proper position relative to said dies and electrodes, and removable means on said frame for rotatably mounting said sprocket whereby said sprocket may be readily withdrawn through said window to provide ready access to said dies and electrodes.

5. Automatic chain welding apparatus comprising in combination an upwardly disposed rigid closed frame having a centrally located window therein, a pair of upset arms pivotally connected at their forward ends to said frame and projecting rearwardly for relative swinging movement about parallel upwardly disposed axes, the forward ends of said arms being bifurcated and flared both inwardly toward each other and outwardly in the direction of their pivotal axes, said arms being substantially symmetrically disposed with respect to said window, aligned pivot pins projecting inwardly from the inner surfaces of said arms and being carried by said arms, an upper arm and a lower arm pivotally mounted on each of said pins and each carrying a welding electrode at its forward end to engage a chain link to be welded, means to effect relative pivotal movement in each pair of upper and lower arms whereby said electrodes may be clamped onto said link at opposite sides of the cleft to be welded, means to move the rear ends of said first mentioned arms toward and away from each other, and a retractible chain-link locating sprocket rotatably mounted on said frame and centrally disposed between the bifurcations of said first mentioned arms.

6. A chain welder comprising in combination a ring-like frame having a pair of upset arms pivotally connected thereto at their forward ends, said arms being bifurcated and flared outwardly in the direction of their pivotal axes at their forward ends and having means engaging their opposite ends to move said opposite ends toward and away from each other, a pivot pin carried by and projecting inwardly from the intermediate portion of each of said arms, said pivot pins being axially aligned and each mounting a pair of tongs, a welding electrode adjustably mounted on the forward end of each tong, an upset die carried by one of the tongs of each pair to engage opposite ends of a chain link to be welded, said arms being disposed substantially symmetrical with respect to said frame, and movable chain-link positioning means normally housed between the bifurcations of said arms and operative to position successive chain links to be welded for proper engagement by said electrodes and dies.

7. Apparatus according to claim 6 further including means to rock said die-carrying tongs about said pins, said dies having flat outer bearing surfaces adapted to have sliding engagement with inner flat surfaces of said arms whereby the upset force applied to a chain link being welded is transmitted directly from said arms to said dies.

8. Chain welding apparatus comprising in combination a rigid frame, a pair of upset arms pivotally connected at their forward ends to said frame and having means engaging their rear ends to move the same toward and away from each other, the forward ends of said arms being bifurcated and flared outwardly in the direction of their pivotal axes whereby the elongated axes of pivotal interconnection between said arms and frame minimize deflection of said arms out of their plane of movement, and chain link upset dies and welding-current conducting electrodes carried by said arms intermediate the ends thereof.

9. Apparatus according to claim 8 further including substantially aligned pivot pins carried by and projecting inwardly from the inner sides of the intermediate portions of each of said arms, a pair of tongs pivoted on each of said pins, said upset dies being carried by aligned tongs of said pairs of tongs, said electrodes being carried by oppositely aligned tongs of said pairs of tongs, and means to open and close said pairs of tongs.

10. Chain welding apparatus comprising in combination a rigid frame, a pair of upset arms pivotally connected at their forward ends to said frame and having means engaging their rear ends to move the same toward and away from each other, a pivot pin carried by and projecting inwardly from the intermediate portion of each of said arms, said pivot pins being axially aligned and each mounting a pair of tongs, a welding electrode adjustably mounted on the forward end of each tong, an upset die carried by one of the tongs of each pair to engage opposite ends of a chain link to be welded, and means to open and close said tongs, said dies having flat bearing surfaces for engaging with flat bearing surfaces on the inner sides of said arms whereby the upset force is transmitted directly from said arms to said dies.

11. A chain welder comprising in combination a ring-like frame, a pair of generally parallel upset arms pivotally mounted on said frame and projecting rearwardly therefrom, means engaging the rear ends of said arms to move the same toward and away from each other, the forward ends of said arms being bifurcated at their points of pivotal attachment to said frame, welding electrodes and upset dies carried by intermediate portions of said arms adjacent said bifurcations, a removable carrier spanning the opening in said frame, a shaft journaled in said carrier, a chain-link locating sprocket keyed to said shaft, and position-determining means also keyed onto said shaft.

12. A welder according to claim 11 further characterized in that said carrier is hingedly mounted on said frame whereby upon outward swinging movement of said carrier said shaft, sprocket, and position-determining means are swung free and clear of said arms, dies and electrodes.

13. A chain welder according to claim 11 further characterized in that said position-determining means comprises a disc having a plurality of circumferentially spaced but axially extending notches in its outer periphery and further including a pawl, and a lever mounting said pawl and operative to move said pawl into said notches in succession upon successive general indexing movements of said sprocket and shaft.

14. A chain welder comprising in combination means constituting a welding station and including welding electrodes and upset dies arranged to have pressure engagement with an open link of a chain to be welded at a substantially fixed location; means to support an assembled chain and to advance the same longitudinally in step-by-step progression to position successive links to be welded at said location comprising a pull-out sprocket and means to periodically rotate said pull-out sprocket a predetermined extent, a locator sprocket positioned adjacent said location, guide means for feeding chain onto said locator sprocket, and means engaging said locator sprocket to precisely orient the same following its general indexing movement resulting from rotation of said pull-out sprocket.

15. A welder according to claim 14 further characterized in that said orienting means comprises a rotatable shaft on which said locator sprocket is keyed, a position-determining disc keyed onto said shaft and having a plurality of axially extending but circumferentially spaced notches in its outer periphery, and a pawl arranged to be moved into said notches in succession following the general indexing movements of said locator sprocket.

16. A welder according to claim 14 further characterized in that said guiding means comprises a sprocket, and means including energy storage means to restrain rotation of said last mentioned sprocket whereby said chain is maintained under back tension and has backward movement upon backward rotation of said locator sprocket by said orienting means.

17. A chain welder comprising welding electrodes and upset dies for engaging an open link of an assembled chain to weld the same closed at a predetermined fixed location, means to advance an assembled chain past said location in step-by-step progression comprising a pull-out sprocket, a continuously rotating shaft, a cam on said shaft, a second shaft mounting said sprocket, a ratchet geared to said second shaft, a cam follower for said cam, and a dog mechanically coupled with said follower and having engagement with said ratchet to periodically rotate said second shaft and sprocket.

18. Apparatus according to claim 17 further including quick detachable means for mounting said sprocket on said second shaft, said quick detachable means including means to adjust the relative rotational positions of said second shaft and said sprocket.

19. Structure according to claim 17 further including a locator sprocket for receiving the assembled chain ahead of said first mentioned sprocket and operative to position successive links to be welded at said fixed location, and means engaging said locator sprocket to independently and accurately orient the same following each general indexing movement resulting from rotation of said first mentioned sprocket.

20. A chain welder comprising in combination a frame, a pair of generally parallel upset arms pivotally connected at their forward ends to said frame and projecting rearwardly therefrom, a shaft extending across the rear ends of said arms in a direction substantially parallel with the plane of movement of said arms and substantially normal to the longitudinal axes of said arms, cam means on said shaft to move the rear ends of said arms apart, adjustable force-applying means engaging the rear ends of said arms to move the same together when released by said cam means, and welding electrodes and upset dies carried by intermediate portions of said upset arms and arranged to have pressure engagement with an open chain link to be welded.

21. Apparatus according to claim 20 further including a pair of tongs pivotally mounted on the intermediate portion of each of said arms, each of said pair of tongs comprising an upper and lower tong pivotally interconnected with their supporting arm at a point intermediate their front and rear ends and carrying at their forward ends one of said upset dies and at least one of said welding electrodes, the rear ends of the tongs of each pair of tongs being interconnected by means of a toggle, and cam means on said shaft to straighten and "break" said toggles to close and open the forward ends of said pairs of tongs.

22. In a chain welder having an upset arm pivotally anchored at its forward end and having adjustable force-applying means engaging its opposite end and tending to move said arm in one rotative direction, a shaft, a cam on said shaft for engaging said arm to move said arm in the opposite rotative direction, a pair of levers pivotally mounted on said arm intermediate their ends for rocking movement relative to each other and to said arm in planes substantially parallel with the longitudinal axes of said arm and with the pivotal axis of said arm, the forward ends of said levers mounting a chain link engaging upset die and at least one welding-current conducting electrode, a toggle interconnecting the rear ends of said levers, and cam means on said shaft to straighten and "break" said toggle whereby the forward ends of said levers may be moved toward and away from each other.

23. Apparatus according to claim 22 further characterized in that said toggle includes preloaded spring linkage whereby the pressure exerted by said electrode on said chain link is readily adjustable and consistent in each succeeding cycle of operation regardless of normal wear of the chain-link engaging tip of said electrode.

24. In a chain welder having a pair of upset arms movable toward and away from each other, a pair of welding electrodes, means mounting one of said electrodes on each of said arms comprising a carrier having a slot in its front face to receive the electrode sidewise, removable means to retain said electrode in said slot, a recess in said carrier, a current-conductive block mounted on the outer end of said electrode and partially receive in said recess, and cooling fluid ingress and egress passages in said block, said electrode being hollow and having its inner space in communication with said passages.

25. Structure according to claim 24 further including means to adjust said electrodes longitudinally comprising integral bosses on each of said carriers outwardly of said recesses, and threaded studs screw-threadedly received in said bosses and bearing against the outer ends of said blocks.

MELVIN M. SEELOFF.
LEROY CONKLIN.

REFERENCES CITED

The following references are of record in the file of this patent:

UNITED STATES PATENTS

| Number | Name | Date |
|---|---|---|
| 2,377,289 | Winter et al. | May 29, 1945 |